June 18, 1963   J. A. RIDGWAY, JR   3,094,572
ALUMINUM CHLORIDE CATALYST ACTIVATION
Filed Aug. 12, 1959
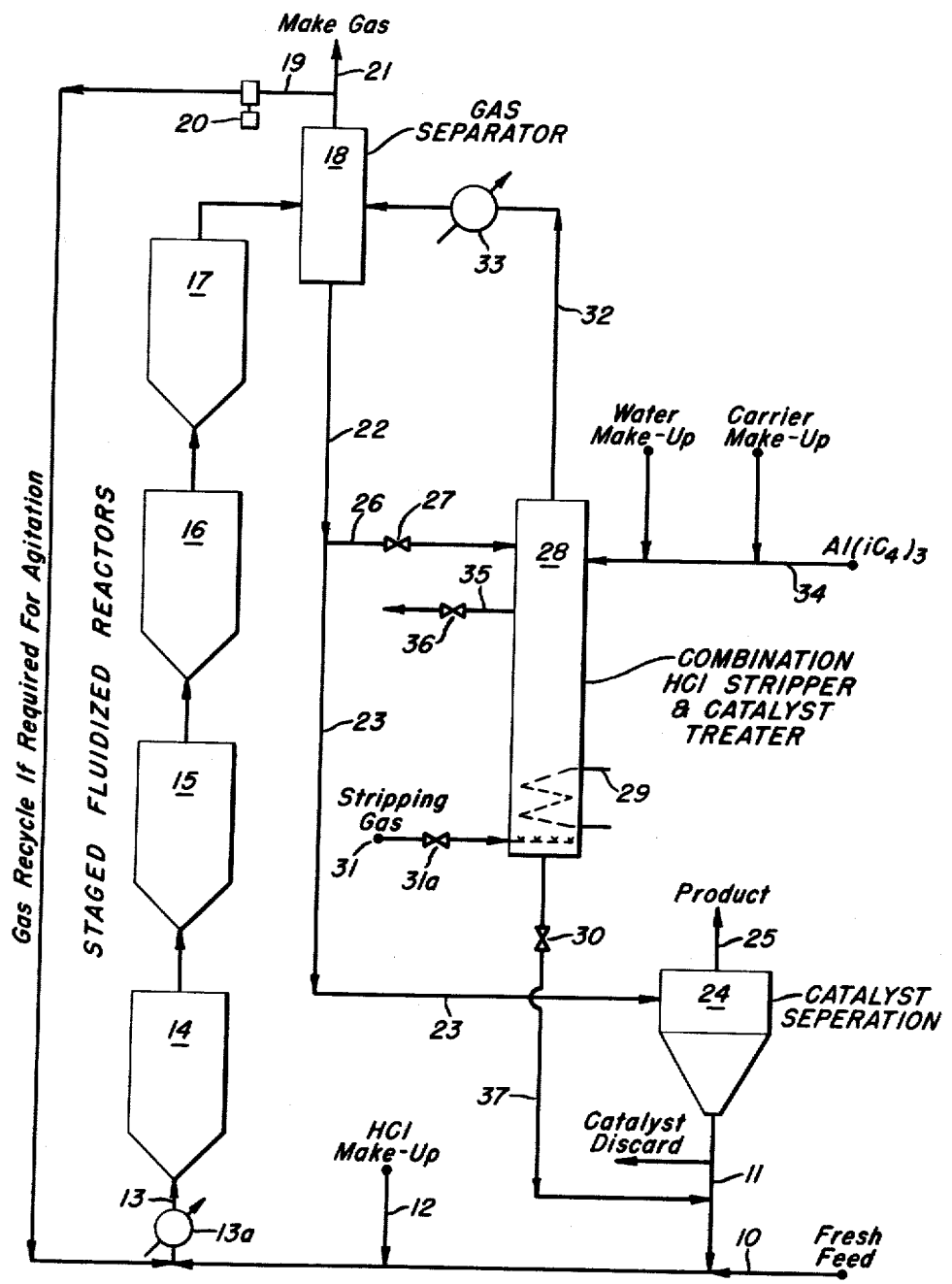
INVENTOR.
John A. Ridgway, Jr.

United States Patent Office 3,094,572
Patented June 18, 1963

3,094,572
ALUMINUM CHLORIDE CATALYST ACTIVATION
John A. Ridgway, Jr., Texas City, Tex., assignor, by mesne assignments, to Standard Oil Company, Chicago, Ill., a corporation of Indiana
Filed Aug. 12, 1959, Ser. No. 833,349
12 Claims. (Cl. 260—683.7)

This invention relates to an improvement in the activation of catalysts employed for effecting isomerization of light paraffinic hydrocarbons and it pertains, more particularly, to an improved technique for preparing and/or regenerating an aluminum chloride-on-adsorbent catalyst.

The object of the invention is to provide a technique for making aluminum chloride isomerization catalysts of increased activity. A further object is to provide a new and improved regeneration technique for $AlCl_3$-on-adsorbent catalysts.

I have found that certain aluminum alkyls, particularly aluminum triisobutyl will readily react with or be absorbed on many solids in presence of readily available hydroxyl radicals. In accordance with my invention, I utilize this phenomenon for activating isomerization catalysts during the course of their preparation and/or regeneration. Aluminum alkyls and aluminum hydroalkyls which are effective for this invention can be prepared from aluminum, hydrogen, and olefins by the K. Ziegler technique, Ang. Chem. 67, p. 424 (1955).

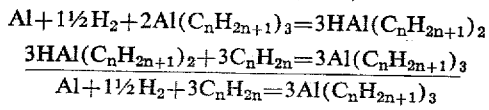

A superactive isomerization catalyst may be prepared by treating an adsorbent such as alumina or silica in the presence of about 0.2 to 2 percent water with a hydrocarbon solution of aluminum triisobutyl wherein the contacting is continued at about 150 to 200° F. until gas evolution substantially ceases and wherein the resulting solid is thereafter saturated with hydrogen chloride. Also an aluminum chloride-on-adsorbent catalyst may be activated by contacting with a hydrocarbon solution of aluminum triisobutyl under these same conditions. When an aluminum chloride-on-adsorbent catalyst prepared by either of these methods (or prepared by any other technique) has become partially deactivated by on-stream conversion of light paraffinic hydrocarbons to more highly branched hydrocarbons, the deactivated catalyst may be regenerated by first removing hydrogen chloride and catalyst deposits which are soluble in hot hydrocarbons and then treating at about 150 to 250° F. with a hot hydrocarbon solution containing about 0.5 to ten, preferably one to two, weight percent aluminum triisobutyl based on catalyst undergoing treatment.

This invention will be more clearly understood from the following detailed description of a preferred example read in conjunction with the accompanying drawing which forms a part of this specification and which is a schematic flow sheet of an isomerization system for utilizing my improved catalyst activation technique.

In this example, a charging stock is employed having the following composition:

| | Vol. percent |
|---|---|
| Cyclopentane | 1.7 |
| 2,2-dimethylbutane | 0.9 |
| 2,3-dimethylbutane | 4.0 |
| 2-methylpentane | 26.5 |
| 3-methylpentane | 25.0 |
| Normal hexane | 31.5 |
| Methylcyclopentane } Cyclohexane | 10.4 |

Since this process utilizes a catalyst which is extremely susceptible to poisoning by aromatic hydrocarbons, the maximum aromatic hydrocarbon content tolerable in the feed is dependent somewhat on the particular catalyst and the temperature of contacting, but in general, not more than about 0.5 volume percent of aromatic hydrocarbons should be present in the feed. It is preferred to operate with a feed which is virtually free of aromatic hydrocarbons, i.e., contains less than about 0.1 volume percent of aromatic hydrocarbons. In addition the feed should be dry and substantially free from sulfur and other materials which would be deleterious to aluminum chloride catalysts.

The catalyst employed in this example is prepared by charging to a 500-ml. flask, equipped with a reflux condenser attached to a manometer and a stopcock for venting, about 250 ml. of 10% cyclohexane+90% 2-methylpentane, 50 ml. (3.4 g.) of finely divided silica (Santocel) previously calcined at 1,000° F., and 0.25 ml. of water is charged to the flask. The contents of the flask are next agitated and purged with hydrogen after which 25 ml. of a 20% solution of aluminum triisobutyl in 2-methylpentane is added thereto. The resulting mixture is heated to about 160° F. while stirring. The pressure is maintained at about 960 mm. by venting until gas evolution ceases. Thereafter, the contents of the flask are cooled to about 100° F. and saturated with anhydrous hydrogen chloride.

The catalyst thus prepared is contacted with the defined charging stock for a period of about 0.5 to 5 hours or more at a temperature in the range of about 50 to 180° F., preferably at about 80 to 120° F., with a catalyst to hydrocarbon weight ratio, in the reaction zone, of about 0.05 to 1.0, preferably 0.1 to 0.5. Hydrogen may be present in amounts which are soluble in the liquid under conversion conditions and at a pressure of about 25 p.s.i.g. but less hydrogen pressure is required than was heretofore deemed necessary (under U.S. 2,443,608).

Referring to the drawing, the described charging stock, which may contain about 0.1 to 1 percent of hydrogen chloride and dissolved hydrogen picked up in an absorber (not shown), is introduced by line 10. It picks up catalyst from line 11 and any required make-up hydrogen chloride from line 12 and introduces the catalyst slurry through line 13 through heater-cooler 13a to hopper-bottom reactor 14 wherein the residence time of the catalyst is longer than that of the liquid. The slurry may pass through a series of reaction zones 15, 16, and 17 before being introduced into gas separation zone 18. Separated gas may be recycled by line 19 and circulating compressor 20 at a rate for obtaining desired agitation in the reactors, net make-gas being vented from the system through line 21.

The liquid slurry is passed from gas separator 18 by lines 22 and 23 to catalyst separator 24 from which the product stream is withdrawn through line 25 and the catalyst slurry is withdrawn through line 11 to be reused.

During continued use the catalyst gradually loses activity making periodic regeneration or replacement necessary in order to maintain a high level of conversion. To regenerate the catalyst valve 30 is closed and valve 27 is opened and a portion of the liquid slurry from gas separator 18 is passed by lines 22 and 26 through valve 27 to vessel 28 which is provided with means for heating or cooling such as coil 29 and means for agitating the slurry such as a stirrer (not shown). When vessel 28 is sufficiently full valve 27 is closed. Since the presence of HCl in vessel 28 causes increased consumption of aluminum alkyl during regeneration most of the HCl is preferably removed. This is accomplished by introducing a stripping gas through gas distributor 31. A suitable gas for this purpose is make gas from gas separator 18 which has had HCl removed by absorbing in fresh feed.

The HCl and light gases removed from vessel 28 are passed by line 32 through cooler 33 back to separator 18. When the desired amount of HCl has been removed from the slurry about one to ten and preferably two to four weight percent of aluminum alkyl based on total catalyst is introduced to vessel 28 through line 34 as a solution in a hydrocarbon which is preferably cyclohexane produced in the system but which may be an aliquot part of the isomerization product or a part of the charge or recycle stream. This solution is intimately mixed with the slurry by stirring or circulation through vessel 28 at a temperature of about 160° F. until gas evolution ceases. The slurry is then cooled to about 100° F. and the excess hydrocarbon liquid may be separated from the catalyst by withdrawing through line 35 and valve 36, although such separation step is not always necessary. The catalyst slurry in line 37 is then introduced into the incoming fresh feed stock in line 10 via line 11 where it joins the catalyst slurry recovered in catalyst separator 24. Any make-up HCl needed to activate the regenerated catalyst is introduced through line 12 as hereinbefore described.

The following tabulation illustrates the effectiveness of my activation technique:

| Hours of Catalyst Use | Catalyst Activity⁴ at 76° F. | |
|---|---|---|
| | 0–20 | 40–60 |
| Fresh Catalyst: | | |
| AlCl₃+alumina catalyst (¹) | 7.5 | 7.5 |
| AlCl₃+alumina catalyst (¹) treated with aluminum alkyl (²) | 26.5 | 7.5 |
| Aluminum alkyl-type catalyst (³) | 34.4 | 8.9 |
| Partially Spent Catalyst: | | |
| AlCl₃+alumina catalyst (¹) | 2.0 | 2.0 |
| AlCl₃+alumina catalyst (¹) after regeneration ² | 15.0 | 5.5 |
| Aluminum alkyl-type catalyst (³) | 1.3 | 1.3 |
| Aluminum alkyl-type catalyst (³) after regeneration (²) | 30.6 | 10.2 |

¹ Prepared by conventional techniques.
² Treated with 1 mol of Al (iC₄)₃ per 10 mols of AlCl₃.
³ Silica+H₂O+Al (iC₄)₃+HCl.
⁴ Gal. 2,2-DMB/hr./lb. of AlCl₃ in cat.×100.

Although a single vessel for regeneration has been described above it is obvious that for continuous catalyst regeneration the use of two parallel vessels would enable freshly regenerated catalyst from one vessel to be added to the fresh feed through an intermediate storage vessel while spent catalyst is being regenerated in the second vessel. As an alternate, regeneration can be accomplished in a single multi-staged vessel on a flow basis wherein HCl stripped spent catalyst slurry is introduced along with aluminum alkyl to the top of the baffled vessel and the regenerated catalyst slurry withdrawn from the bottom and reintroduced into the system.

While a staged slurry type of operation has been referred to, it should be understood the invention is applicable to fixed bed systems wherein one or more reactors is continuously on-stream for regeneration while one or more other reactors is taken off-stream for regeneration. The on-stream periods may range from 8 to 120 hours or more; by regenerating at 60 hour frequency, catalyst activity can be maintained substantially above that of fresh catalyst prepared by absorbing aluminum chloride-on-alumina. The initial catalyst may be made by separately metering about 25 parts by weight of aluminum chloride and 75 parts by weight of an acid treated and calcined bauxite, such as Porocel or other known absorbent alumina, into a hydrocarbon liquid such as cyclohexane and agitating the resulting slurry at about 100 to 200° F. until the aluminum chloride is uniformly deposited on the surface area of the adsorbent. Aluminum chloride-on-adsorbent catalyst thus prepared or prepared by other known techniques can be regenerated by use of aluminum triisobutyl as herein described.

The hexane charging stock, in this example, is converted into a product containing 45 percent neohexane, and catalyst activity can be maintained at a level that will allow production of at least about 35 percent neohexane for long periods of time. It has been ascertained that freshly prepared catalyst activated by my aluminum triisobutyl technique may have an activity which is about four times greater than aluminum chloride-on-adsorbent catalyst heretofore known. Catalysts regenerated by my aluminum triisobutyl technique have been found to have activities several times as high as obtainable by regenerations effected without the use of aluminum alkyl.

When aluminum triisobutyl is added to a stirred hydrocarbon slurry of adsorbent, such as in the preparation of the catalyst of this invention, the adsorbent becomes more wetted by the hydrocarbon as evidenced by the complete dispersion of the adsorbent in the total liquid. This wetting effect greatly assists in the preparation of a catalyst having all solid particles activated.

While stirred reactors or fixed bed reactors may be employed in the on-stream isomerization step, the upflow multi-stage system herein described is advantageous in that it avoids the necessity of employing agitators, it enables precise control of mixing and contact time, it minimizes erosion, and it allows continuous regeneration or discard so that the activity of the catalyst can be held within desired limits.

Aluminum trimethyl does not appear to be equivalent to aluminum triisobutyl in effecting catalyst activation, and while the latter is my preferred treating agent, it should be understood that isobutyl aluminum hydride, isobutyl aluminum hydroxide, and the like may be used with some measure of success. In addition, activation with isobutyl aluminum hydroxide can also be used to replenish any active hydroxyl radicals lost from the catalyst during regeneration.

While the invention has been described as applied to a preferred example thereof, it should be understood that alternative arrangements, steps and operating conditions will be apparent from the above description to those skilled in the art. When any aluminum alkyl is used wherein the alkyl is ethyl, n-propyl, i-propyl, n-butyl, amyl, etc., the same amounts, concentrations, and conditions should be employed as described hereinabove for aluminum triisobutyl. In addition, some of the alkyl groups may be replaced by H, OH, or Cl. The catalyst preparations should be in the presence of a small amount of water, which may be present as water of hydration of the adsorbent.

I claim:
1. The method of preparing an aluminum chloride on adsorbent isomerization catalyst which comprises treating a material selected from the class consisting of adsorbent and aluminum chloride-adsorbent with a liquid hydrocarbon solution of an aluminum alkyl having more than one carbon atom per alkyl radical at a temperature in the range of about 150 to 200° F. in the presence of water and subsequently contacting the treated material with hydrogen chloride, said treating being in the presence of readily available hydroxyl radicals.

2. The method of claim 1 which involves the regeneration of an aluminum chloride-adsorbent catalyst previously used for on-stream isomerization and wherein the used catalyst is stripped for removing hydrogen chloride and deposits therefrom before being contacted with hydrocarbon solution of aluminum alkyl.

3. The method of claim 1 wherein the material is selected from the group of alumina and silica, and the aluminum alkyl is aluminum triisobutyl.

4. The method of claim 1 wherein the liquid hydrocarbon is a mixture of hexanes.

5. The method of claim 4 wherein the liquid is chiefly cyclohexane.

6. The method of activating an aluminum chloride-on-adsorbent catalyst containing about 15 to 30 weight percent aluminum chloride which method comprises washing said catalyst with hot hydrocarbon, then contacting said catalyst in the presence of water with a hot aluminum alkyl solution in saturated $C_6$ hydrocarbons, said solution containing about 1 to 10 weight percent based on catalyst being activated of an aluminum alkyl having more than one carbon atom per alkyl radical, heating said catalyst in admixture with said solution at a temperature of about 150 to 200° F. until evolution of gas substantially ceases, and subsequently treating the catalyst with hydrogen chloride.

7. The method of claim 6 wherein the hot aluminum alkyl solution is saturated $C_6$ hydrocarbon is separated from the catalyst before treating the catalyst with hydrogen chloride.

8. The method of isomerizing normal hexane and methylpentanes to form neohexane which method comprises contacting a mixture of said normal hexane and methylpentanes in the presence of about two to ten volume percent of naphthenes by contacting under isomerization conditions in the presence of hydrogen chloride with an aluminum chloride-adsorbent catalyst activated by an aluminum alkyl having an isobutyl radical and effecting the contacting by flowing a catalyst slurry upwardly in a plurality of contacting zones wherein the liquid component of a catalyst slurry flows upwardly at a more rapid rate than the catalyst component.

9. A catalyst for isomerizing light normal paraffinic hydrocarbons to obtain more highly branched structure which catalyst consists essentially of aluminum chloride and adsorbent, said catalyst having been prepared by treating an adsorbent in the presence of readily available hydroxyl radicals with a liquid hydrocarbon solution of an aluminum alkyl having more than one carbon atom per alkyl radical at a temperature in the range of about 150 to 200° F. and subsequently contacting the treated adsorbent with hydrogen chloride.

10. The catalyst of claim 9 wherein said adsorbent is selected from the group consisting of alumina and silica.

11. The catalyst of claim 10 wherein the said treating step includes the addition of a small amount of water.

12. The process of isomerizing light normal paraffinic hydrocarbons to obtain more highly branched structure wherein said hydrocarbons are contacted with a solid catalyst under a pressure sufficient to maintain the liquid phase and in the presence of hydrogen chloride activator with a space velocity, contact time, and temperature to effect substantial isomerization of said hydrocarbons, wherein said catalyst is the catalyst of claim 11.

References Cited in the file of this patent

UNITED STATES PATENTS 2,418,419     Mavity _____ Apr. 1, 1947

UNITED STATES PATENT OFFICE
CERTIFICATE OF CORRECTION

Patent No. 3,094,572                            June 18, 1963

John A. Ridgway, Jr.

It is hereby certified that error appears in the above numbered patent requiring correction and that the said Letters Patent should read as corrected below.

Column 3, in the table, first column, line 5 thereof, for "catalysr" read -- catalyst --; column 5, line 11, for "is", first occurrence, read -- in --.

Signed and sealed this 24th day of December 1963.

(SEAL)
Attest:
ERNEST W. SWIDER

EDWIN L. REYNOLDS

Attesting Officer                          Acting Commissioner of Patents